G. S. SPENCER.
OUTSIDE SHAFT BEARING AND STUFFING BOX FOR BOATS.
APPLICATION FILED MAR. 16, 1908.

917,676.

Patented Apr. 6, 1909.

WITNESSES:
H. A. Lamb.
George W. Finn

INVENTOR:
George S. Spencer.
BY Geo. D. Phillips
his ATTORNEY.

UNITED STATES PATENT OFFICE.

GEORGE S. SPENCER, OF MOODUS, CONNECTICUT, ASSIGNOR OF ONE-HALF TO JAMES A. BALEN, OF EAST HADDAM, CONNECTICUT.

OUTSIDE SHAFT-BEARING AND STUFFING-BOX FOR BOATS.

No. 917,676.     Specification of Letters Patent.     Patented April 6, 1909.

Application filed March 16, 1908. Serial No. 421,333.

*To all whom it may concern:*

Be it known that I, GEORGE S. SPENCER, a citizen of the United States, and a resident of Moodus, in the county of Middlesex and State of Connecticut, have invented certain new and useful Improvements in Outside Shaft-Bearings and Stuffing-Boxes for Boats, of which the following is a specification.

My invention relates to outside bearings and stuffing-boxes for the propeller-shaft of boats, and has for its object to provide a construction whereby the propeller-shaft is always lubricated within the stuffing-box, and the end-thrust is either all taken up in the stuffing-box or is divided between the stuffing-box and the engine; further, to maintain the packing under spring tension and thereby obviate the necessity of frequently tightening the stuffing-box gland.

Figure 1:
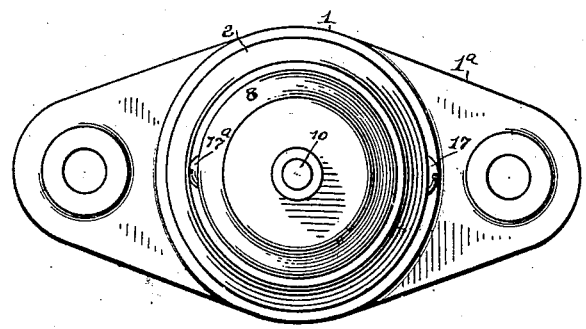
Figure 2:
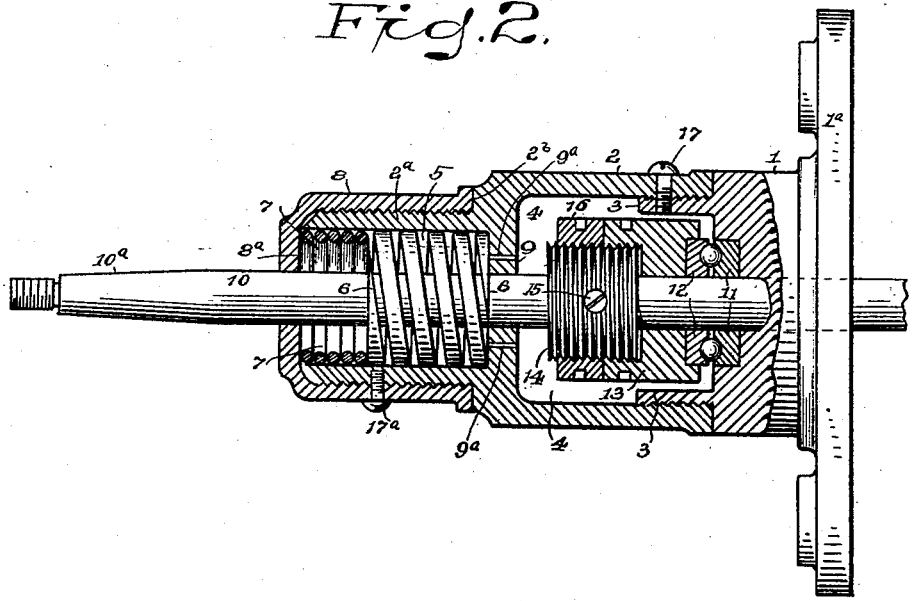

To enable others to understand my invention, reference is had to the accompanying drawings, in which:

Figure 1 represents a detail front end elevation of the stuffing-box and propeller-shaft; Fig. 2 is a broken sectional view of the propeller-shaft bearing and sectional view of the stuffing-box, packing and ball-cases, and broken view of the propeller-shaft.

Its construction and operation are as follows:

1 indicates the hub or base adapted to be secured to the stern-post of a boat by means of its flange 1$^a$.

2 indicates a shell having a threaded mouth adapted to engage the threaded lip 3 of the main bearing. 4 indicates the oil chamber within said shell adapted to be filled with oil or other suitable lubricating material.

The stuffing-box proper is formed by the threaded lip 2$^a$ of the shell 2 having the chambered portion 5 adapted to receive the spring 6 and the packing 7.

8 indicates the interiorly threaded stuffing-box gland adapted to engage with the threaded lip 2$^a$ of the shell 2. The packing is firmly held against the inner wall 8$^a$ of said gland by means of the spring 6 acting against the outer face of the central bearing 9 of the shell 2.

10 indicates the propeller-shaft whose tapered end 10$^a$ is adapted to receive the propeller-wheel (not shown). The end-thrust bearing on this shaft comprises the ball-bearing cases 11 and 12, the former being firmly seated in a recess of the base 1 while the latter is seated in a recess in the inner or right hand face of the adjustable nut 13. The outer face of this nut has a threaded recess adapted to engage with the threaded collar 14 firmly secured to the propeller-shaft by means of the screw 15. The jam-nut 16 is mounted on this collar and is adapted to firmly lock the nut 13 when the ball-bearing has been properly adjusted.

17 indicates a locking screw which passes through the shell 2 and the threaded lip 3 of the base 1 to prevent the shell turning back when once firmly shouldered against the hub. Whenever it becomes necessary to refill the oil chamber, this screw is removed and the oil is poured or lubricant forced through the screw-hole into said chamber. The screw 17$^a$ locks the stuffing-box gland 8 to the lip 2$^a$ of the shell 2.

It has been the custom heretofore, especially in small boats or launches, to locate the end-thrust bearing for the propeller-shaft at the engine. This arrangement makes more or less of a drag or load on the engine which is entirely eliminated by bringing said end pressure or thrust against the stern-post of the boat and locating the ball-bearings in the outer bearing of the propeller-shaft. If there is already a ball-bearing on the propeller-shaft hub of the engine, the end-thrust can be divided between the stern-post and engine, or it may all be brought against the stern-post.

It is not only a very difficult operation to pack the stuffing-box, located as it is under water and unhandy to get at, but it is also a troublesome matter to keep it tight for any length of time so that water and sand can not work through to the detriment of the outer bearing for the propeller-shaft. Consequently, it is customary to crowd as much packing as possible into the stuffing-box and screw the gland up as far as it can be forced at the time, and, as fast as the packing wears, the gland must be advanced to take up this wear. This being a difficult matter to do, and the construction being out of sight, it is frequently neglected until the stuffing-box is ruined.

When the stuffing-box gland 8 is being screwed up, it will force the packing 7 against the spring 6, compressing the latter to such an extent that when the mouth of the gland is brought firmly against the shouldered portion 2ᵇ of the shell 2, there will have been sufficient power stored up in the spring to compensate for the wear on the packing for a long period of time; thus entirely doing away with the necessity of continually tightening up the gland. In other words, the gland is screwed firmly against the shoulder 2ᵇ at the start, leaving the spring to react on the packing and maintain a tight joint around the propeller-shaft.

It is not only necessary that the journals for the shaft should be well lubricated, but it is equally important that the packing be lubricated too, else the propeller-shaft will be cut by the friction caused by the shaft running against dry packing. For this purpose, the holes 9ᵃ are formed in the wall or central bearing 9 so that the chamber 5 may also be filled with oil. Once these chambers are filled with oil or other lubricant, it will suffice for an entire season. The oil will not only keep the ball-bearing lubricated, but the packing and all of the other bearings as well. By the arrangement above described, it is possible to keep the outer end of the stuffing-box gland thoroughly lubricated, which heretofore has been a difficult matter to do.

Having thus described my invention, what I claim as new and desire to secure by Letters Patent is:

1. The combination, in a combined stuffing-box and outside bearing for a propeller-shaft, of a base having a flange portion adapted to be secured to the stern of a boat, the propeller-shaft journaled in said base, a shell having a threaded mouth adapted to be secured on a threaded portion of said base and thus form an oil-chamber, a threaded collar secured to said shaft and within the oil-chamber, an adjusting nut carrying in its inner vertical face a ball-bearing case, the opposite ball-bearing case secured in a recess of said base, means for tightening said nut, a stuffing-box in the outer end of said shell, a partition-wall between said stuffing-box and oil-chamber, a stuffing-box gland shouldered against said shell, packing within said stuffing-box, a spring between said partition-wall and packing adapted to be compressed when said gland is seated so that the resilient action of said spring will crowd the packing against the end wall of said gland, for the purpose set forth.

2. The combination, in a combined stuffing-box and propeller-shaft bearing, of a flanged base, a threaded extension therefor, a shell carrying a stuffing-box at one end and having a recess with a threaded mouth at the other end adapted to be secured on the threaded extension of the base and thus form an oil-reservoir of said recess, means for locking said shell and base together, a ball-bearing end-thrust bearing within said oil-chamber, a partition-wall between the stuffing-box recess and the oil chamber to form a bearing for the propeller-shaft, a gland for said stuffing-box firmly seated against said shell, packing, a metal spring behind said packing adapted to be compressed when the stuffing-box gland is seated, for the purpose set forth.

Signed at East Haddam, in the county of Middlesex and State of Connecticut this 12th day of March A. D. 1908.

GEORGE S. SPENCER.

Witnesses:
WALTER W. BECKWITH,
S. P. CLARK.